Oct. 15, 1957  S. E. NORWOOD ET AL  2,809,691
ADJUSTABLE BACK FOR SEAT
Filed Sept. 14, 1954  3 Sheets-Sheet 1
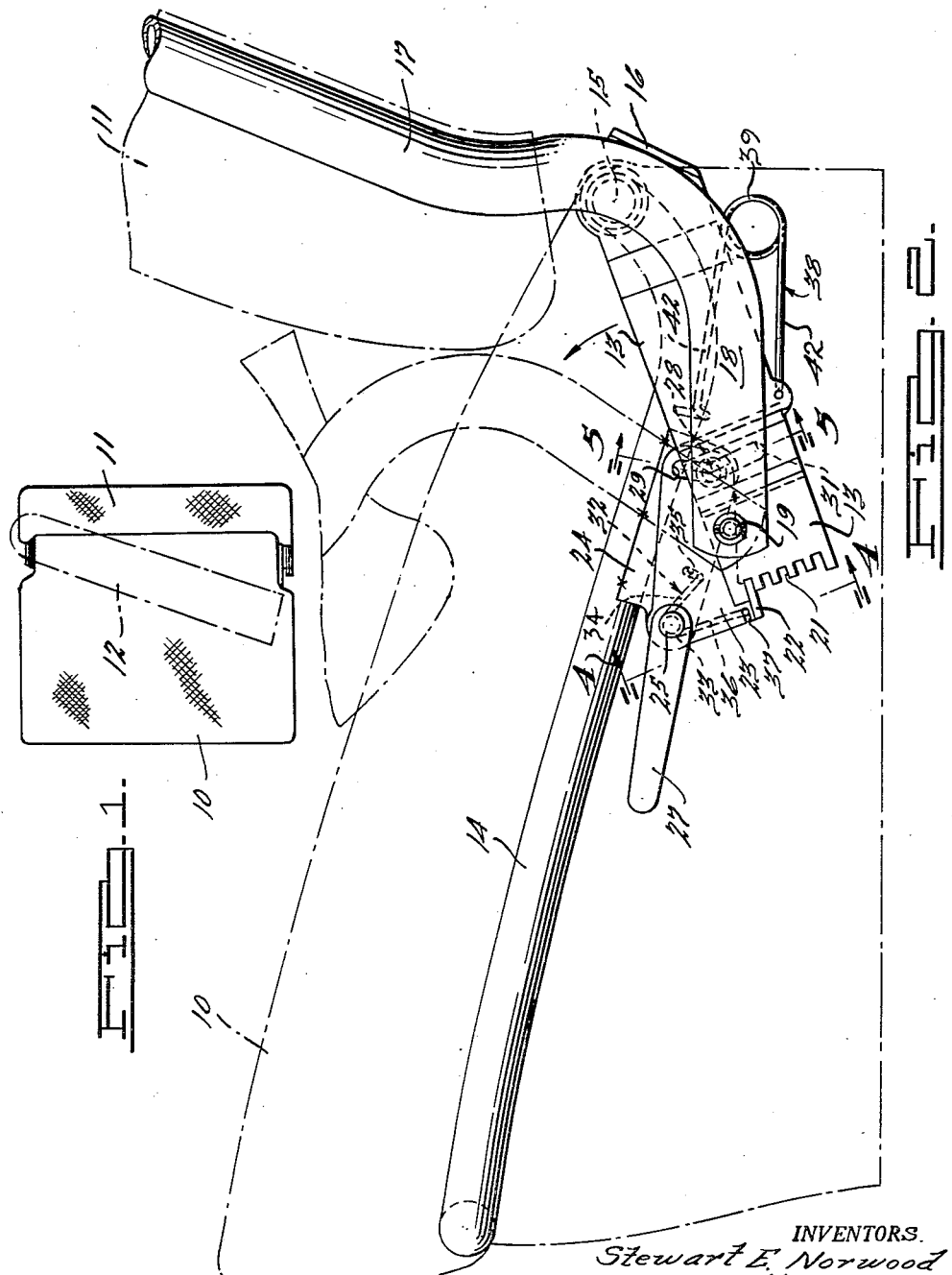
INVENTORS.
Stewart E. Norwood
BY Russell G. Heyl, Jr.
Harness, Dickey & Pierce
ATTORNEYS.

Oct. 15, 1957 S. E. NORWOOD ET AL 2,809,691
ADJUSTABLE BACK FOR SEAT

Filed Sept. 14, 1954 3 Sheets-Sheet 2

INVENTORS.
Stewart E. Norwood.
Russell G. Heyl, Jr.
BY
Harness, Dickey & Pierce
ATTORNEYS.

Oct. 15, 1957 S. E. NORWOOD ET AL 2,809,691
ADJUSTABLE BACK FOR SEAT
Filed Sept. 14, 1954 3 Sheets-Sheet 3
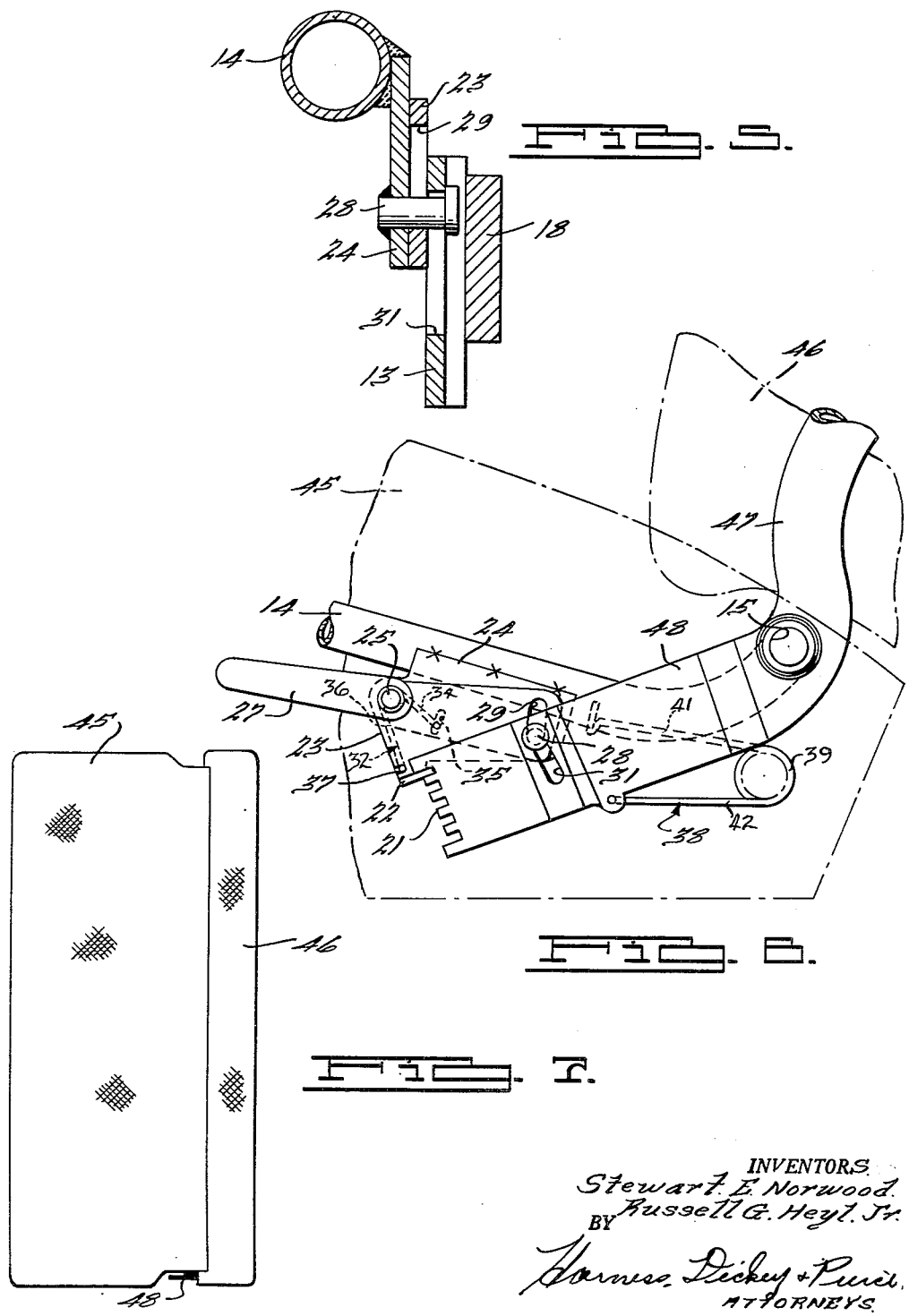
INVENTORS.
Stewart E. Norwood
Russell G. Heyl, Jr.
BY
Harness, Dickey & Pierce
ATTORNEYS.

United States Patent Office 2,809,691
Patented Oct. 15, 1957

2,809,691

ADJUSTABLE BACK FOR SEAT

Stewart E. Norwood, Dearborn, and Russell G. Heyl, Jr., Birmingham, Mich., assignors to American Metal Products Company, Detroit, Mich., a corporation of Michigan Application September 14, 1954, Serial No. 455,992

13 Claims. (Cl. 155—161)

This invention relates to seating structures, and particularly to a seat having a pivoted back thereon which is adjustable to be disposed in different angular positions relative to the vertical.

It has been the practice in the art to provide seats for automobiles and the like, with a back which is tiltable forwardly to permit ingress to the rear seat area back of the front seat of the vehicle. A seat may be pivoted angularly so as to tilt toward the front inner corner of the seat cushion, providing greater clearance for entrance to the back seat area. A pivoted arm, having a stop thereon, forms an adjustable support to which the end of the back frame is pivoted to permit the frame to engage the stop in the same position relative to the pivoted arm. The unpivoted end of the arm is provided with a plurality of teeth located adjacent to a finger on a movable plate. The finger may be moved into any one of the notches and thereby vary the angular position of the arm and the pivot of the back frame, which thereby tilts the back forwardly or rearwardly, depending upon the notch with which the finger engages. In this manner, a bucket type of back or a full seat back may be tilted forwardly to provide greater entrance room for the occupants in the back seat and, at the same time, permit the occupants of the front seat to adjust the back angularly forwardly or rearwardly, as may be desired.

Accordingly, the main objects of the invention are: to provide a pivoted arm upon which the end of the back frame is pivoted relative to a stop on the arm which is adjustable to various angular positions to thereby change the angular position of the back; to pivot an arm on the seat frame and secure the unpivoted end in various latched positions for changing the position of a back, the end of the frame of which is pivoted to the said arm which may be tilted and returned to engage a stop which limits the rearward pivotal movement of the seat; to provide adjustable means for adjusting the angular position of the back of an automobile while permitting it to tilt forwardly from the various adjusted positions and, in general, to provide a support for a back which is tiltable and angularly adjustable, which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a plan view of a bucket type seat employed in an automobile having a back supported thereon embodying features of the present invention;

Fig. 2 is an enlarged, broken side view of the structure illustrated in Fig. 1;

Fig. 5 is an enlarged sectional view of the structure illustrated in Fig. 2, taken on the line 5—5 thereof;

Fig. 6 is a view of structure, similar to that illustrated in Fig. 2, showing another form which the invention may assume, and Fig. 7 is a view of a full seat having a back mounted thereon which may be adjusted in different angular positions.

Figure 3:
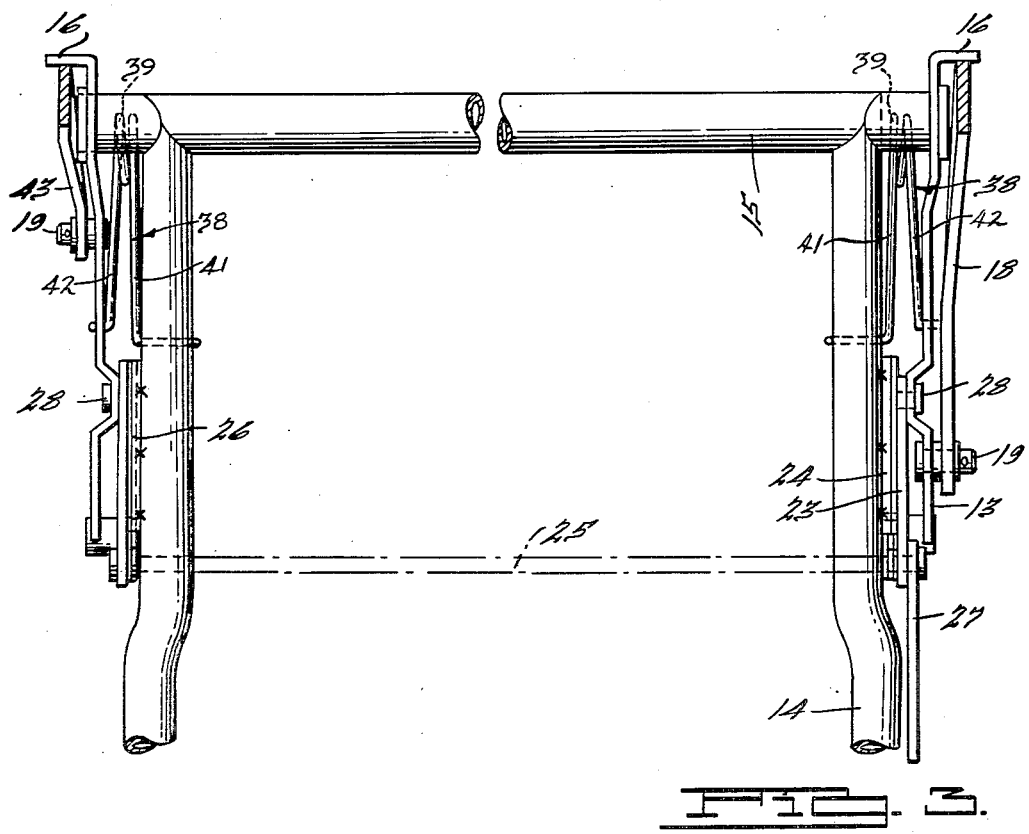
Fig. 3 is a broken plan view of the structure illustrated in Fig. 2.
Figure 4:
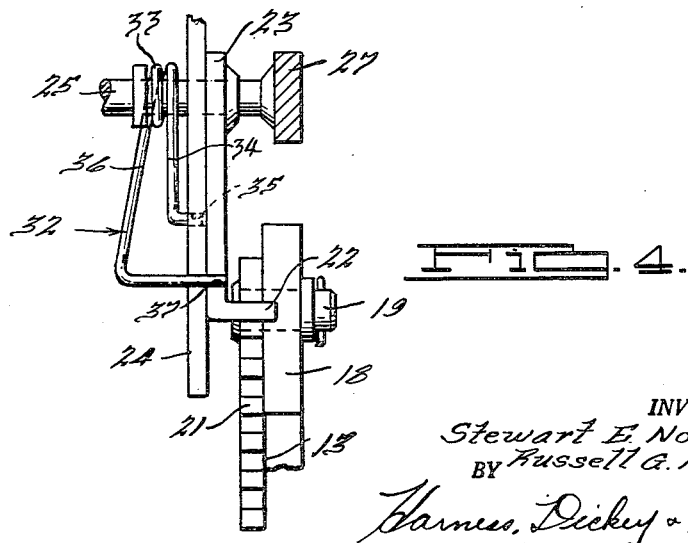
Fig. 4 is a sectional view of the structure illustrated in Fig. 2, taken on the line 4—4 thereof.

Referring to Figs. 1 to 5, the invention pertains to mounting structure for a seat back by which the seat back may be adjusted to various positions while being tiltable forwardly at an angle to the front cushion edge. A seat is illustrated in Fig. 1 embodying a seat cushion 10 having a back cushion 11 supported thereon for forward tilting movement angularly or parallel to the side end of the seat, as illustrated by the dot and dash line 12. The back is so mounted as to be adjustable to different angular positions to the seat cushion. An arm in the nature of a link 13 is pivoted to the seat frame 14 on the pivot 15 thereof, having an angular flange 16 extending therefrom which functions as a stop member against which the frame 17 of the back cushion 11 abuts. The forward extending arm 18 of the back frame is secured by a pivot 19 to the arm or link 13 near the forward end on the left-hand side of the seat assembly. The forward end of the link 13 is provided with a plurality of notches 21 into which a finger 22 on a plate 23 may enter to secure the end of the arm at different positions of adjustment about the pivot 15. Plates 24 and 26 are welded to opposite sides of the seat frame 14 for pivotally supporting a rod 25 to which an operating handle 27 is secured. The plates 23 on the opposite sides of the seat are welded to the rod 25 and move the fingers 22 from a notch 21 in the arms 13 when the handle 27 is pulled upwardly. The plates 24 and 26 have studs 28 secured thereto which extend through a slot 29 in the plate 23 and a slot 31 in the arm or link 13, the slots being struck from centers about the rod 25 and pivots 15, respectively.

A spring 32 has a coiled portion 33 disposed about the rod 25 and an arm 34 provided with an end secured in a slot 35 in the plates 24 and 26 and an arm 36, the end of which is secured in a notch 37 in the plate 23. The spring is so tensioned as to urge the finger 22 within a notch 21. A spring 38, having a coiled portion 39, has one arm 41 secured in an aperture in the arm or link 13 and the other arm 42 arcuately formed to engage the seat frame 14. The spring is so tensioned as to urge the link 13 counterclockwise.

A similar construction is provided on the opposite side of the seat. In this arrangement, the arm 43 on the inner side of the seat frame is substantially shorter than the arm 18, with the pivot 19 therefor disposed adjacent to the pivot 15 of the link. Sufficient clearance is provided between the apertures in the arms and the pivots 19 to permit the angular movement of the back across the seat since the line about which the seat will tilt forwardly will be that through the pivots 19. Since the rod 25 has the plate 23 on the inner side welded thereto, the operation of the handle 27 on the outer side will produce the operation of both plates 23 for moving the fingers 22 from a notch 21. Thereafter, if the back is to be tilted rearwardly, the operator leans back until the proper angle is reached, whereupon the handle 27 is released to cause the finger to engage a notch adjacent thereto, urged therein by the springs 32 acting on the plates 23. If it is desired to have the back adjusted forwardly, the handle 27 is then raised, the operator leans forwardly, removing the pressure from the back so that the spring 38 will urge the link 13 downwardly and after the desired forward adjustment of the back has occurred, the handle 27 is released, permitting the fingers 22 to engage the adjacent notches 21. With this arrangement, the seat back may be adjusted at various angles to the vertical while permitting the back to be tilted forwardly across the seat to obtain ingress to the seating area in rear of the back.

Referring to Figs. 6 and 7, a further form of the invention is illustrated, that wherein a seat 45 is of a length to extend across the entire width of the body, having a back 46 thereon which may be adjusted to various angular positions. In this arrangement, the back frame 47 is secured on the pivot 15 at each side of the seat, having a forwardly-extending arm 48 which is similar to the arm or link 13 in the structure illustrated in Figs. 1 to 5 inclusive. In this arrangement, the forward portion of the arm 48 is provided with the notches 21 in which the finger 22 extends to secure the back in desired angular position relative to the seat cushion. The same plates 24 and 26 are secured to the seat frame 14 and a pair of the plates 24 is secured to the pivoted rod 25 which is actuated by the operating handle 27. The plates 24 and 26 support the studs 28 which extend through the slots 29 in the plate 23 and arm 48. Springs 32 urge the fingers 22 within a notch 21, while the springs 38 urge the arms 48 downwardly and the back frame 47 forwardly when the finger 22 is moved from the notch 21 and pressure is removed from the back frame 47. In either arrangement, whether the back cushion is constructed to pivot forwardly or not, the back cushion may be adjusted to different angular positions relative to the vertical.

What is claimed is:

1. In a seating structure, a seat frame, a back frame, means for pivoting said back frame on said seat frame, an arm extending forwardly at each end of the back frame, notches in the forward portion of said arms, and a pivoted latch plate at each side of the seat frame having a finger which extends within one of said notches.

2. In a seating structure, a seat frame, a back frame, means for pivoting said back frame on said seat frame, an arm extending forwardly at each end of the back frame, notches in the forward portion of said arms, a pivoted latch plate at each side of the seat frame having a finger which extends within one of said notches, a pivoted rod fixed to said latch plates, and a handle on said rod by which the latch plates are moved to move the fingers from a notch in the arm at each side of the seat frame.

3. In a seating structure, a seat frame, a back frame, means for pivoting said back frame on said seat frame, an arm extending forwardly at each end of the back frame, notches in the forward portion of said arms, a pivoted latch plate at each side of the seat frame having a finger which extends within one of said notches, a pivoted rod fixed to said latch plates, a handle on said rod by which the latch plates are moved to move the fingers from a notch in the arm at each side of the seat frame, and a spring for urging said arms downwardly and the back frame forwardly.

4. In a seating structure, a seat frame, a back frame, means for pivoting said back frame on said seat frame, an arm extending forwardly at each end of the back frame, notches in the forward portion of said arms, a pivoted latch plate at each side of the seat frame having a finger which extends within one of said notches, a pivoted rod fixed to said latch plates, a handle on said rod by which the latch plates are moved to move the fingers from a notch in the arm at each side of the seat frame, a spring for urging said arms downwardly and the back frame forwardly, and a second spring urging said latch plates to move the fingers into a slot.

5. In a seating structure, a seat frame, a back frame, a link pivoted at each side of the seat frame extending forwardly of the pivot and having notches in the forward edge and having a stop flange adjacent to said pivot, a forward extending arm on the back frame at each side of the seat, pivot means joining the ends of said arms to said links, a bracket at each side of the seat frame, a rod extending through said brackets, and a latch plate at each side of the seat frame secured to said rod, said latch plates having a finger thereon which is movable into a notch in said link after the seat back has been adjusted to a desired position.

6. In a seating structure, a seat frame, a back frame, a link pivoted at each side of the seat frame extending forwardly of the pivot and having notches in the forward edge and having a stop flange adjacent to said pivot, a forward extending arm on the back frame at each side of the seat, pivot means joining the ends of said arms to said links, a bracket at each side of the seat frame, a rod extending through said brackets, a latch plate at each side of the seat frame secured to said rod, said latch plates having a finger thereon which is movable into a notch in said link after the seat back has been adjusted to a desired position, and an operating handle secured to said rod on the outer side of said seat frame.

7. In a seating structure, a seat frame, a back frame, a link pivoted at each side of the seat frame extending forwardly of the pivot and having notches in the forward edge and having a stop flange adjacent to said pivot, a forward extending arm on the back frame at each side of the seat, pivot means joining the ends of said arms to said links, a bracket at each side of the seat frame, a rod extending through said brackets, a latch plate at each side of the seat frame secured to said rod, said latch plates having a finger thereon which is movable into a notch in said link after the seat back has been adjusted to a desired position, an operating handle secured to said rod on the outer side of said seat frame, and a spring secured between said frame and said link for urging the arms downwardly and the seat back frame forwardly.

8. In a seating structure, a seat frame, a back frame, a link pivoted at each side of the seat frame extending forwardly of the pivot and having notches in the forward edge and having a stop flange adjacent to said pivot, a forward extending arm on the back frame at each side of the seat, pivot means joining the ends of said arms to said links, a bracket at each side of the seat frame, a rod extending through said brackets, a latch plate at each side of the seat frame secured to said rod, said latch plates having a finger thereon which is movable into a notch in said link after the seat back has been adjusted to a desired position, an operating handle secured to said rod on the outer side of said seat frame, a spring secured between said frame and said link for urging the arms downwardly and the seat back frame forwardly, and a second spring secured between said plates and bracket for urging the fingers toward a notch.

9. In a seating structure, a seat frame, a back frame, a link pivoted at each side of the seat frame extending forwardly of the pivot and having notches in the forward edge and having a stop flange adjacent to said pivot, a forward extending arm on the back frame at each side of the seat, pivot means joining the ends of said arms to said links, a bracket at each side of the seat frame, a rod extending through said brackets, a latch plate at each side of the seat frame secured to said rod, said latch plates having a finger thereon which is movable into a notch in said link after the seat back has been adjusted to a desired position, an operating handle secured to said rod on the outer side of said seat frame, a spring secured between said frame and said link for urging the arms downwardly and the seat back frame forwardly, and a second spring secured between said plates and bracket for urging the fingers toward a notch, said arms of the back frame being of different lengths to cause the frame to tilt at an angle across the seat when moved forwardly away from said stop flanges.

10. In a seating structure, a seat frame, a back frame, a link pivoted at each side of the seat frame extending forwardly of the pivot and having notches in the forward edge and having a stop flange adjacent to said pivot, a forward extending arm on the back frame at each side of the seat, pivot means joining the ends of said arms to said links, a bracket at each side of the seat frame, a rod extending through said brackets, and a latch plate at each side of the seat frame secured to said rod, said latch plates having a finger thereon which is movable into a notch in said link after the seat back has been adjusted to a desired position, said arms of the back frame being of different lengths to cause the frame to tilt at an angle across the seat when moved forwardly away from said stop flanges.

11. In a seating structure, a seat frame, a back frame, pivot means on said seat frame, means extending forwardly from said pivot means having notches on the ends which are adjustable to different positions, means supporting said back frame for tilting movement with said extending means, and pivoted fingers engageable with one of the notches for retaining the back frame in adjusted position.

12. In a seating structure, a seat frame, a back frame, pivot means on said seat frame, means extending forwardly from said pivot means having notches on the ends which are adjustable to different positions, means supporting said back frame for tilting movement with said extending means, and pivoted fingers engageable with one of the notches for retaining the back frame in adjusted position, said back frame being tiltable relative to said forwardly extending means across said seat frame from said adjusted position.

13. In a seating structure, a seat frame, a back frame, a link pivoted at each side of the seat frame extending forwardly of the pivot, one link having notches in the forward edge and having a stop flange adjacent to said pivot, a forwardly extending arm on the back frame at each side of said seat frame, pivot means joining the ends of said arms to said links, a bracket at the side of said seat frame having a notched forwardly extending arm, a latch plate at said side, said latch plate having a finger thereon which is movable into a notch in said arm after said seat back has been adjusted to desired position, and a torque bar secured to said forwardly extending links permitting said links to pivot and said back to be held in adjusted position by the latch at one side of the assembly.

References Cited in the file of this patent

UNITED STATES PATENTS

| | | |
|---|---|---|
| 469,569 | Hogan | Feb. 23, 1892 |
| 1,821,298 | Ferreira | Sept. 1, 1931 |
| 2,132,729 | Galamb | Oct. 11, 1938 |
| 2,177,408 | Haslup | Oct. 24, 1939 |
| 2,281,037 | Jones | Apr. 28, 1942 |
| 2,283,485 | Beck | May 19, 1942 |
| 2,336,013 | Hamilton | Dec. 7, 1943 |
| 2,627,894 | Herider | Feb. 10, 1953 |

FOREIGN PATENTS

| | | |
|---|---|---|
| 127,084 | Australia | June 19, 1945 |